United States Patent
Sundararajan et al.

(10) Patent No.: US 10,863,538 B2
(45) Date of Patent: Dec. 8, 2020

(54) GRANT PROCESSING DURING GRANT-FREE UPLINK REPETITIONS

(71) Applicant: QUALCOMM Incorporated, San Diego, CA (US)

(72) Inventors: Jay Kumar Sundararajan, San Diego, CA (US); Chih-Ping Li, San Diego, CA (US); Jing Jiang, San Diego, CA (US); Wanshi Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/280,708

(22) Filed: Feb. 20, 2019

(65) Prior Publication Data

US 2019/0268932 A1   Aug. 29, 2019

Related U.S. Application Data

(60) Provisional application No. 62/635,452, filed on Feb. 26, 2018.

(51) Int. Cl.
*H04W 72/14* (2009.01)
*H04L 5/00* (2006.01)
*H04W 72/12* (2009.01)
*H04L 1/18* (2006.01)

(52) U.S. Cl.
CPC ............... *H04W 72/14* (2013.01); *H04L 1/18* (2013.01); *H04L 5/0048* (2013.01); *H04W 72/1284* (2013.01)

(58) Field of Classification Search
None
See application file for complete search history.

(56) References Cited

U.S. PATENT DOCUMENTS

| | | | |
|---|---|---|---|
| 2018/0035459 A1* | 2/2018 | Islam | H04L 5/0096 |
| 2018/0199359 A1* | 7/2018 | Cao | H04W 72/1268 |
| 2018/0270860 A1* | 9/2018 | Bhorkar | H04W 72/0406 |
| 2018/0317256 A1* | 11/2018 | Um | H04W 74/0808 |

(Continued)

OTHER PUBLICATIONS

CATT: "On UL Transmission Procedures", 3GPP Draft, R1-1717836, 3rd Generation Partnership Project (3GPP), Mobile Competence Centre, 650, RouteDes Luciloles, F-06921 Sophia-Antipolis Cedex, France, vol. RAN WG1, No. Prague, Czechia, Oct. 9, 2017-Oct. 13, 2017, Oct. 3, 2017 (Oct. 3, 2017), XP051352791, 6 Pages,Retrieved from the Internet: URL:http://www.3gpp.org/ftp/tsg_ran/WG1_RL1/TSGR1_90b/Docs/ [retrieved on Oct. 3, 2017], Section 4.

(Continued)

*Primary Examiner* — Chi H Pham
*Assistant Examiner* — Vladislav Y Agureyev
(74) *Attorney, Agent, or Firm* — Harrity & Harrity, LLP

(57) ABSTRACT

Various aspects of the present disclosure generally relate to wireless communication. In some aspects, a user equipment (UE) may receive a grant that identifies a set of uplink resources. The UE may determine whether a timing of the grant overlaps with a repetition window of a grant-free uplink communication configured on the UE. The UE may process the grant based at least in part on whether the timing of the grant overlaps with the repetition window of the grant-free uplink communication. Numerous other aspects are provided.

30 Claims, 7 Drawing Sheets

(56) References Cited

U.S. PATENT DOCUMENTS

| | | | |
|---|---|---|---|
| 2019/0053211 A1* | 2/2019 | Ying | H04W 72/044 |
| 2019/0081741 A1* | 3/2019 | Al-Imari | H04L 1/1614 |
| 2019/0230689 A1* | 7/2019 | Cao | H04L 1/1819 |
| 2019/0261354 A1* | 8/2019 | Fakoorian | H04L 1/1896 |
| 2019/0280821 A1* | 9/2019 | Zhang | H04L 1/1614 |
| 2019/0335496 A1* | 10/2019 | Li | H04L 1/1819 |
| 2019/0350039 A1* | 11/2019 | June | H04W 72/042 |
| 2019/0357178 A1* | 11/2019 | Bae | H04L 1/0061 |

OTHER PUBLICATIONS

International Search Report and Written Opinion—PCT/US2019/018996—ISA/EPO—dated Apr. 24, 2019.

Lenovo et al., "HARQ Design for Uplink Grant-Free Transmission", 3GPP Draft, R1-1719746, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 19, 2017 (Nov. 19, 2017), XP051370415, 4 Pages, Retrieved from the Internet:URL:http://www.3gpp.org/ftp/tsg%5Fran/WG1%5FRL1/TSGR1%5F91/Docs/ [retrieved on Nov. 19, 2017], Section 2.

Samsung: "Procedures for UL Transmissions", 3GPP Draft, R1-1720342, Procedures for UL Transmission, 3rd Generation Partnership Project (3GPP), Mobile Competence Centre, 650, Route Des Lucioles; F-06921 Sophia-Antipolis Cedex, France, vol. RAN WG1, No. Reno, USA, Nov. 27, 2017-Dec. 1, 2017, Nov. 18, 2017 (Nov. 18, 2017), XP051369927, 5 Pages, Retrieved from the Internet:URL:http://www.3gpp.org/ftp/tsg%5Fran/WG1%5FRL1/TSGR1%5F91/Docs/ [retrieved on Nov. 18, 2017], Section 2.3.

* cited by examiner

GRANT PROCESSING DURING GRANT-FREE UPLINK REPETITIONS

CROSS REFERENCE TO RELATED APPLICATION UNDER 35 U.S.C § 119

This application claims priority to U.S. Provisional Application No. 62/635,452, filed on Feb. 26, 2018, entitled "TECHNIQUES AND APPARATUSES FOR GRANT PROCESSING DURING GRANT-FREE UPLINK REPETITIONS," which is incorporated by reference herein.

FIELD OF THE DISCLOSURE

Aspects of the present disclosure generally relate to wireless communication, and more particularly to techniques and apparatuses for grant processing during grant-free uplink repetitions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a grant that identifies a set of uplink resources; determining whether a timing of the grant overlaps with a repetition window of a grant-free uplink communication configured on the UE; and processing the grant based at least in part on whether the timing of the grant overlaps with the repetition window of the grant-free uplink communication.

In some aspects, a user equipment (UE) for wireless communication may include memory and one or more processors coupled to the memory. The memory and the one or more processors may be configured to receive a grant that identifies a set of uplink resources; determine whether a timing of the grant overlaps with a repetition window of a grant-free uplink communication configured on the UE; and process the grant based at least in part on whether the timing of the grant overlaps with the repetition window of the grant-free uplink communication.

In some aspects, a non-transitory computer-readable medium may store one or more instructions for wireless communication. The one or more instructions, when executed by one or more processors of a user equipment (UE), may cause the one or more processors to receive a grant that identifies a set of uplink resources; determine whether a timing of the grant overlaps with a repetition window of a grant-free uplink communication configured on the UE; and process the grant based at least in part on whether the timing of the grant overlaps with the repetition window of the grant-free uplink communication.

In some aspects, an apparatus for wireless communication may include means for receiving a grant that identifies a set of uplink resources; means for determining whether a timing of the grant overlaps with a repetition window of a grant-free uplink communication configured on the apparatus; and means for processing the grant based at least in part on whether the timing of the grant overlaps with the repetition window of the grant-free uplink communication.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
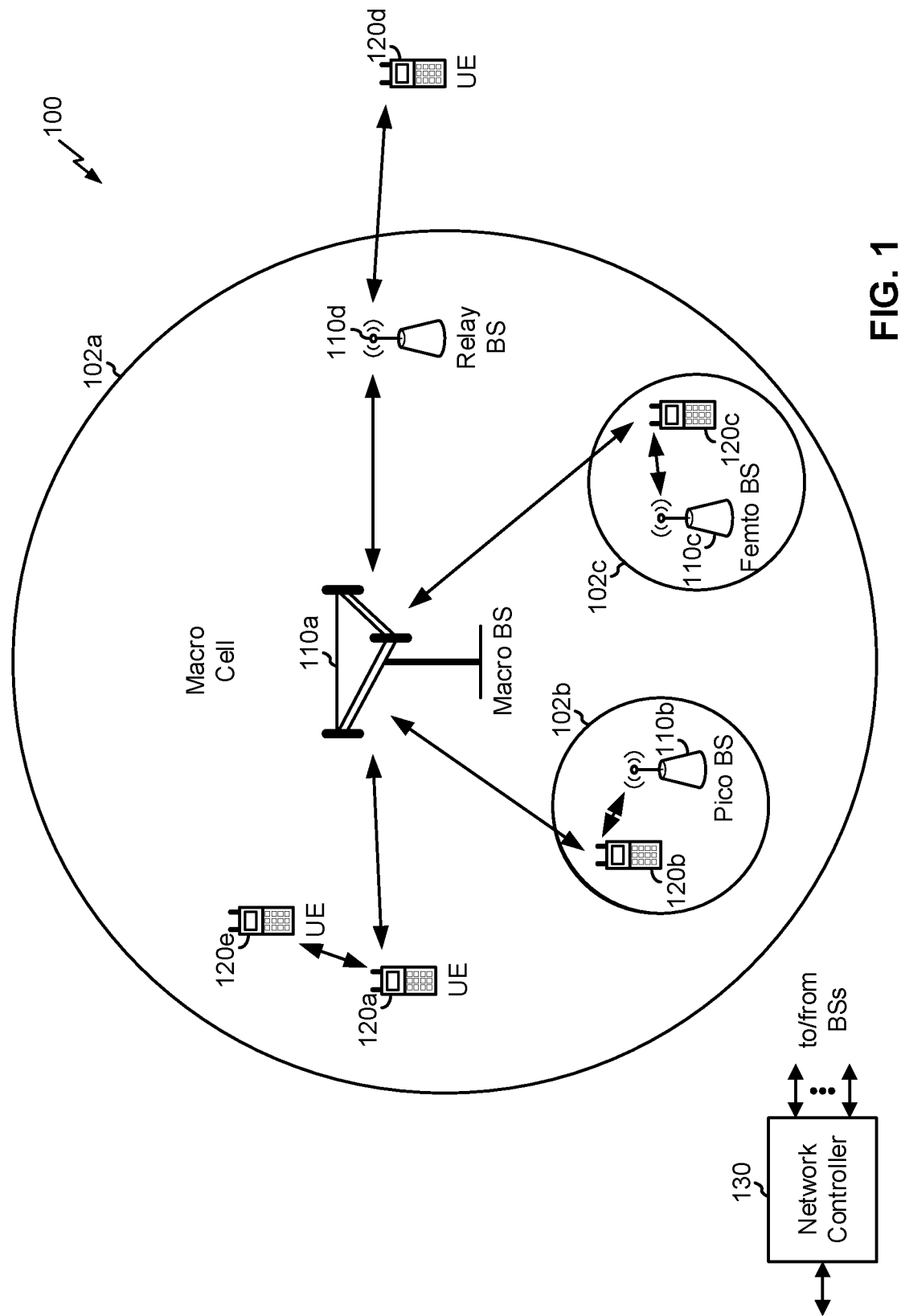
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
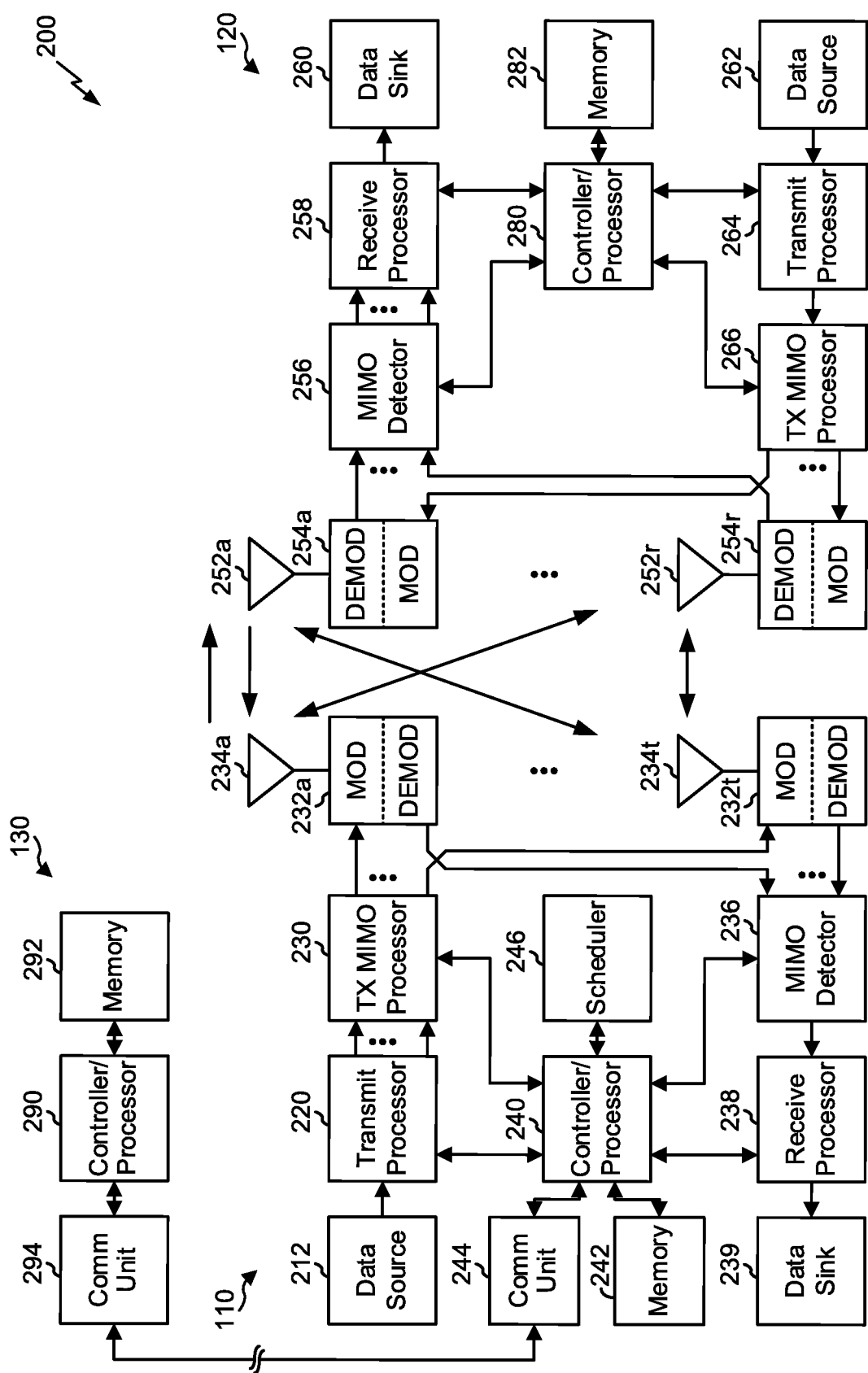
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with grant processing during grant-free uplink transmissions, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a grant that identifies a set of uplink resources, means for determining whether a timing of the grant overlaps with a repetition window of a grant-free uplink communication configured on UE 120, means for processing the grant based at least in part on whether the timing of the grant overlaps with the repetition window of the grant-free uplink communication, and/or the like. In some aspects, such means may include one or more components of UE 120 described in connection with FIG. 2.

As indicated above, FIG. 2 is provided merely as an example. Other examples are possible and may differ from what was described with regard to FIG. 2.

Figure 3A:
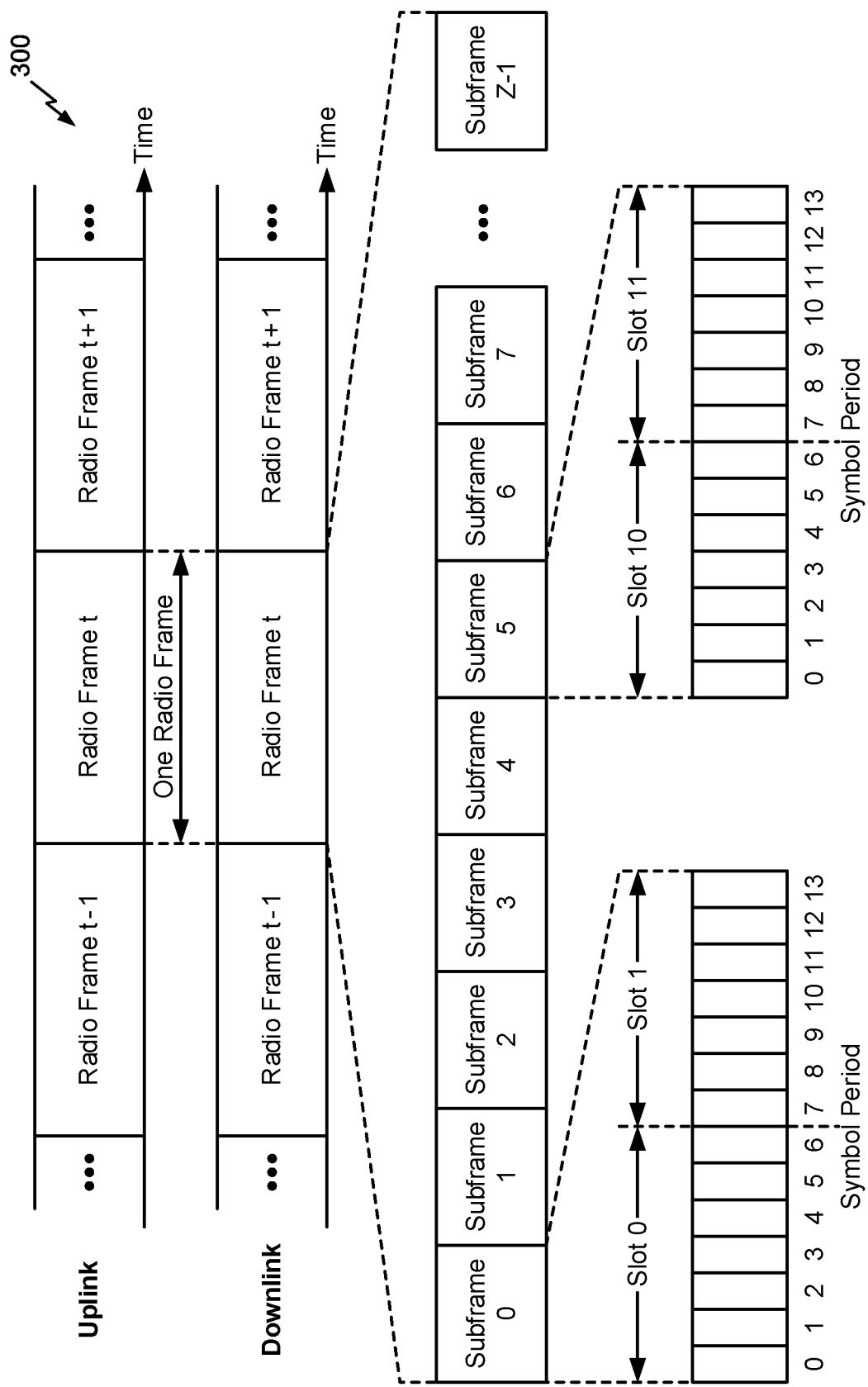
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
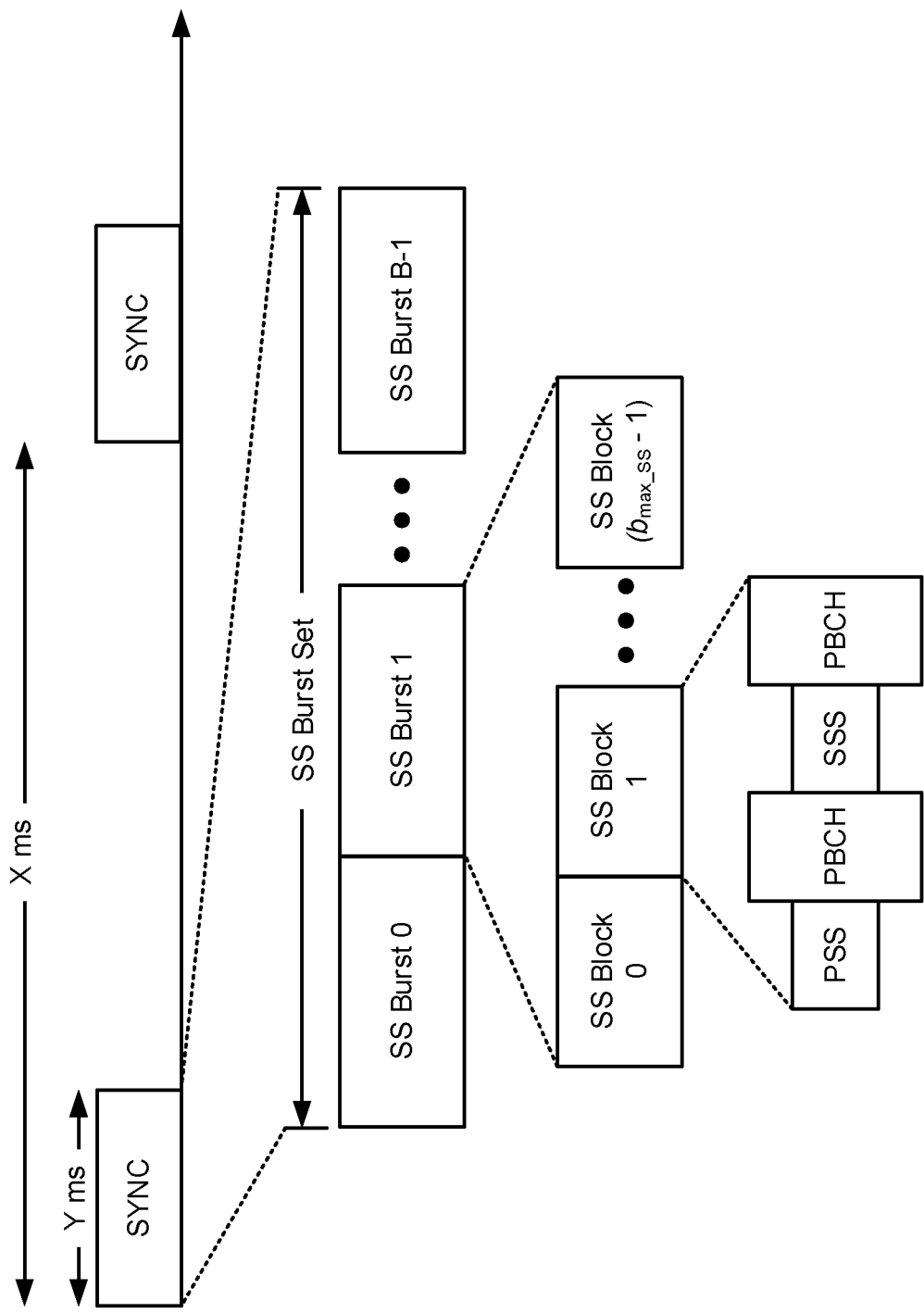
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
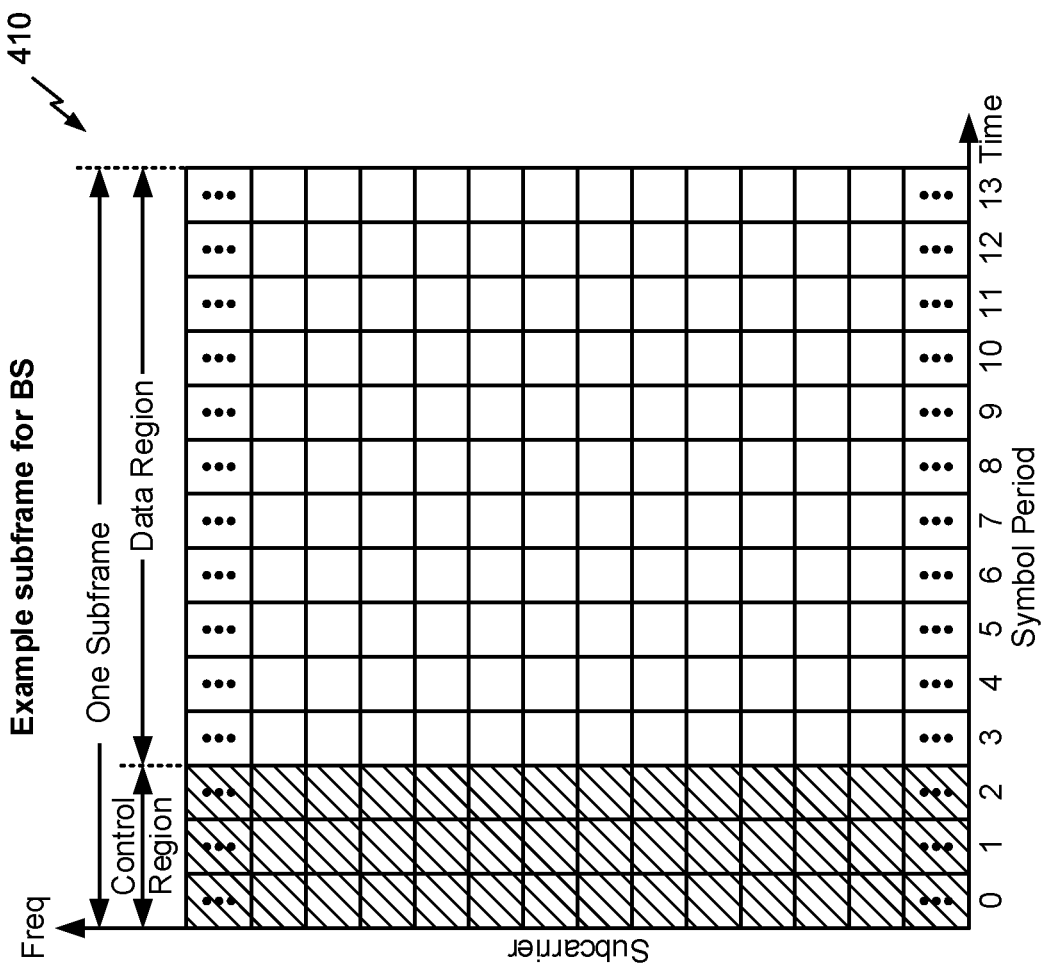
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q E $\{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

In a wireless communication system, such as a NR system, a UE may be configured to transmit an uplink communication on a grant-free basis (e.g., such that the UE transmits the uplink communication without receiving an explicit grant from a base station). Such a communication is herein referred to as a grant-free uplink communication. In some cases, the UE may be configured to transmit K (K≥1, such as 1, 2, 4, or 8) repetitions of a given grant-free uplink communication (e.g., such that the UE transmits the grant-free uplink communication K times) in order to, for example, increase a likelihood that a base station will be able to successfully detect the UE and/or decode the grant-free uplink communication. A duration of time during which the UE is to transmit the K repetitions of the grant-free uplink communication is herein referred to as a repetition window. When the UE is configured with a grant-free uplink communication, the UE may receive (e.g., via downlink control information (DCI)) a grant that identifies a particular set of uplink resources. In this case, the behavior of the UE is not defined and, thus, may result in improper operation of the wireless communication system.

Some aspects described herein provide techniques and apparatuses for processing a grant received by a UE configured to transmit a grant-free uplink communication. In some aspects, the UE may process the grant based at least in part on whether a timing of the grant overlaps a repetition window of the grant-free uplink communication configured on the UE, as described in further detail below.

Figure 5:
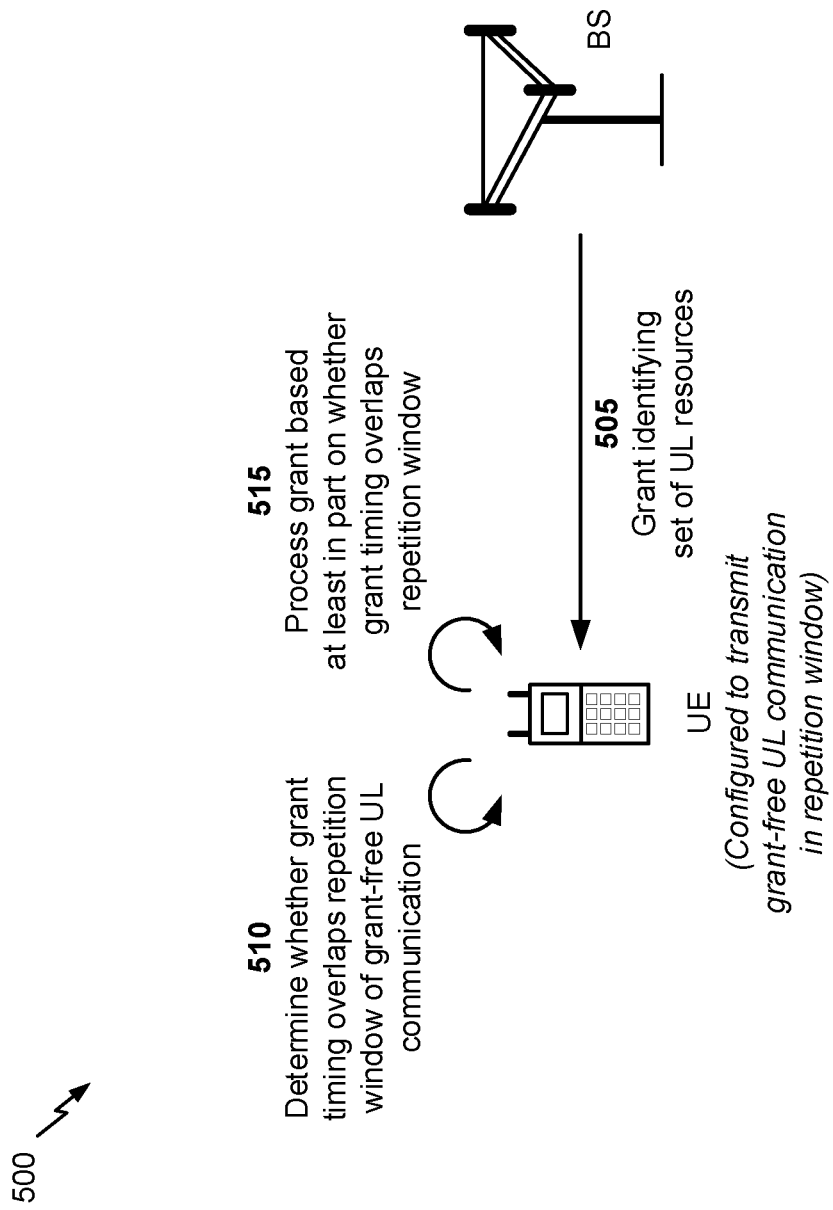
FIG. 5 is a diagram illustrating an example of grant processing during grant-free uplink transmissions, in accordance with various aspects of the present disclosure.

FIG. 5 is a diagram illustrating an example 500 of grant processing during grant-free uplink repetitions, in accordance with various aspects of the present disclosure. As indicated in FIG. 5, a UE (e.g., UE 120) is configured to transmit K repetitions of a grant-free uplink communication during a repetition window. In some aspects, the grant-free uplink communication may be a physical uplink shared channel (PUSCH) transmission. In some aspects, the UE may be configured to transmit the grant-free uplink communication based at least in part on configuration information received from a base station (e.g., base station 110) via, for example radio resource control (RRC) signaling.

As shown in FIG. 5, and by reference number 505, the UE may receive a grant that identifies a set of uplink resources. In some aspects, the set of uplink resources identifies one or more resources to be used by the UE for an uplink communication. In some aspects, the UE may receive the grant via DCI.

As shown by reference number 510, the UE may determine whether a timing of the grant overlaps with the repetition window of the grant-free uplink communication. In some aspects, a manner in which the UE processes the grant is based at least in part on whether the timing of the grant overlaps with the repetition window of the grant-free uplink communication, as described in further detail below.

In some aspects, the timing of the grant may be associated with a time at which the UE receives the grant. For example, the timing of the grant may correspond to a particular time (e.g., a timestamp) at which the UE receives the grant. In such a case, the UE may determine whether the timing of the grant overlaps with the repetition window of the grant-free uplink communication based at least in part on whether the repetition window has passed (e.g., whether the UE has completed all of the K configured repetitions of grant-free uplink communication) by the time at which the UE receives the grant. Here, if the UE determines that the repetition window has not passed by the time at which the UE receives the grant, then the UE may determine that that timing of the grant overlaps with the repetition window of the grant-free uplink communication. Conversely, if the UE determines that the repetition window has passed by the time at which the UE receives the grant, then the UE may determine that that timing of the grant does not overlap with the repetition window of the grant-free uplink communication.

Additionally, or alternatively, the timing of the grant may be associated with the set of resources identified by the grant. In such a case, the UE may determine whether the timing of the grant overlaps with the repetition window of the grant-free uplink communication based at least in part on whether the set of uplink resources, identified by the grant, overlaps with the repetition window in the time domain. Here, if the UE determines that the set of uplink resources, identified by the grant, overlaps one or more resources of the repetition window in the time domain, then the UE may determine that the timing of the grant overlaps with the repetition window. Conversely, if the UE determines that the set of uplink resources, identified by the grant, does not overlap any resources of the repetition window in the time domain, then the UE may determine that that timing of the grant does not overlap the repetition window.

Additionally, or alternatively, the timing of the grant may be associated with a slot or a subframe in which the grant is received. In such a case, the UE may determine whether the timing of the grant overlaps with the repetition window of the grant-free uplink communication based at least in part on whether the slot or the subframe in which the grant is received falls within the repetition window associated with the grant-free uplink communication.

Additionally, or alternatively, the timing of the grant may be associated with a slot or a subframe in which the set of resources, identified by the grant, is located. In such a case, the UE may determine whether the timing of the grant overlaps with the repetition window of the grant-free uplink communication based at least in part on whether the slot or the subframe in which the set of resources, identified by the grant, falls within the repetition window associated with the grant-free uplink communication.

As further shown in FIG. 5, and by reference number 515, the UE may process the grant based at least in part on whether the timing of the grant overlaps with the repetition window of the grant-free uplink communication.

In some aspects, if the UE determines that the timing of the grant overlaps with the repetition window of the grant-free uplink communication, then the UE may process the grant by interpreting the grant as an acknowledgment (ACK) of data associated with the grant-free uplink communication. In other words, the UE may process the grant by interpreting the grant as an indication that the base station has detected the UE and/or successfully decoded the grant-free uplink communication. In some aspects, the UE may then transmit other data (e.g., data other than that transmitted in the grant-free uplink communication) in the set of uplink resources based at least in part on interpreting the grant as an ACK of the data associated with the grant-free uplink communication.

Additionally, or alternatively, if the UE determines that the timing of the grant overlaps with the repetition window of the grant-free uplink communication, then the UE may process the grant by interpreting the grant as a negative acknowledgment (NACK) of data associated with the grant-free uplink communication. In other words, the UE may process the grant by interpreting the grant as an indication that the base station did not detect the UE and/or was unable to successfully decode the grant-free uplink communication. In some aspects, the UE may then retransmit the data, associated with the grant-free uplink communication, in the set of uplink resources based at least in part on interpreting the grant as a NACK of the data associated with the grant-free uplink communication (e.g., without any further repetitions of the data).

In some aspects, the manner in which the UE interprets the grant may be configured on the UE based at least in part on a standard that defines a manner in which the UE is to interpret grants for which timing overlaps a repetition window (e.g., such that the UE interprets each grant in the same manner). Additionally, or alternatively, the manner in which the UE interprets the grant may be configured on the UE based at least in part on configuration information received via RRC signaling, via the DCI associated with the grant, and/or the like.

In some aspects, the UE may receive an ACK of data associated with the grant-free uplink communication (e.g., when the base station transmits the ACK to the UE). In such a case, if the UE determines that the timing of the grant overlaps with the repetition window of the grant-free uplink communication, then the UE may process the grant by transmitting other data in the set of uplink resources, identified by the grant, based at least in part on receiving the ACK.

In some aspects, the UE may receive a NACK of data associated with the grant-free uplink communication (e.g., when the base station transmits the NACK to the UE). In such a case, if the UE determines that the timing of the grant overlaps with the repetition window of the grant-free uplink communication, then the UE may process the grant by retransmitting the data in the set of uplink resources, identified by the grant, based at least in part on receiving the NACK (e.g., without any further repetitions of the data).

In some aspects, the UE may terminate further repetitions of the grant-free uplink communication in the repetition window based at least in part on determining that the timing of the grant overlaps with the repetition window. For example, the UE may cease transmitting further repetitions of the grant-free uplink communication based at least in part on determining that the timing of the grant overlaps with the repetition window of the grant-free uplink communication. Here, termination of the repetitions is possible since the UE has either obtained an ACK associated with the grant-free uplink communication (e.g., by interpreting the grant as an ACK or by receiving an ACK from the base station) or obtained a NACK associated with the grant-free uplink communication (e.g., by interpreting the grant as a NACK or by receiving a NACK from the base station) and retransmitted the data, associated with the grant-free uplink communication, in the set of resources identified by the grant. In either case, further repetitions of the data, associated with the grant-free uplink communication, are not needed and, thus, the UE may terminate the repetitions of the grant-free uplink communication, thereby conserving radio resources, reducing latency at the UE (e.g., by allowing the UE to move on to a next transmission), reducing interference in the wireless communication network, reducing congestion in the wireless communication network, and/or the like.

As indicated by the above aspects, a grant that is received during the repetition window of the grant-free uplink communication may provide information that impacts the repetitions of the grant-free uplink communication within the repetition window. For example, as illustrated by the above aspects, if the timing of the grant overlaps with the repetition window, then the grant may trigger an early termination of the repetitions or may trigger an early (e.g., before an end of the repetition window) grant-based retransmission. As such, it may be beneficial for the UE to treat a grant with timing that overlaps with the repetition window differently from a grant with timing that does not overlap the repetition window.

For example, as described above, if the timing of the grant overlaps with the repetition window of the grant-free uplink communication, then the UE may interpret the grant as an ACK and may terminate the repetitions early (e.g., and move on to transmitting other data). However, if the timing of the grant does not overlap with the repetition window, then the UE may interpret the grant as a NACK and may use the scheduled resources for retransmission of data associated with the grant-free uplink communication.

In some aspects, a grant may be sent by the base station for receipt by the UE such that the timing overlaps with the repetition window only if data (e.g., a packet) is decoded early (e.g., before an end of the repetition window). In this case, the UE may interpret the grant as an ACK and may terminate the repetition sequence early, which may reduce interference due to unnecessary transmissions, improve latency at the UE (e.g., by allowing the UE to move on to transmitting a next packet), reduce network congestion, reduce interference in the wireless communication network, and/or the like.

In some aspects, a grant may be sent by the base station for receipt by the UE such that the timing overlaps with the repetition window only if the base station determines early (e.g., before the end of the repetition window) that it is unlikely that the base station will be able to decode the data (e.g., when the base station has detected that a number of contending UEs on a resource, associated with the grant-free uplink communication, satisfies a threshold). In this case, the UE may interpret the grant as a NACK and may use the grant to perform a retransmission on the set of resources.

In some aspects, if the UE determines that the timing of the grant does not overlap with the repetition window of the grant-free uplink communication, then the UE may process the grant by interpreting the grant as a grant associated with transmitting another uplink communication. In such a case, the UE may transmit the other uplink communication in the set of resources, accordingly.

Additionally, or alternatively, if the UE determines that the timing of the grant does not overlap with the repetition window of the grant-free uplink communication, then the UE may process the grant by interpreting the grant as a grant for retransmitting data associated with the grant-free uplink communication. In such a case, the UE may retransmit the data, associated with the grant-free uplink communication, in the set of resources (e.g., without any further repetitions).

In some aspects, the UE may receive an ACK of data associated with the grant-free uplink communication (e.g., when the base station transmits the ACK to the UE). In such a case, if the UE determines that the timing of the grant does not overlap with the repetition window of the grant-free uplink communication, then the UE may process the grant by transmitting other data in the set of uplink resources, identified by the grant, based at least in part on receiving the ACK. In some aspects, the UE may transmit the other data for the configured number of repetitions (e.g., the UE may begin transmitting K repetitions of the other data).

In some aspects, the UE may receive a NACK of data associated with the grant-free uplink communication (e.g., when the base station transmits the NACK to the UE). In such a case, if the UE determines that the timing of the grant does not overlap with the repetition window of the grant-free uplink communication, then the UE may process the grant by retransmitting the data in the set of uplink resources, identified by the grant, based at least in part on receiving the NACK (e.g., without any further repetitions of the data).

As indicated above, FIG. 5 is provided as an example. Other examples are possible and may differ from what was described with respect to FIG. 5.

Figure 6:
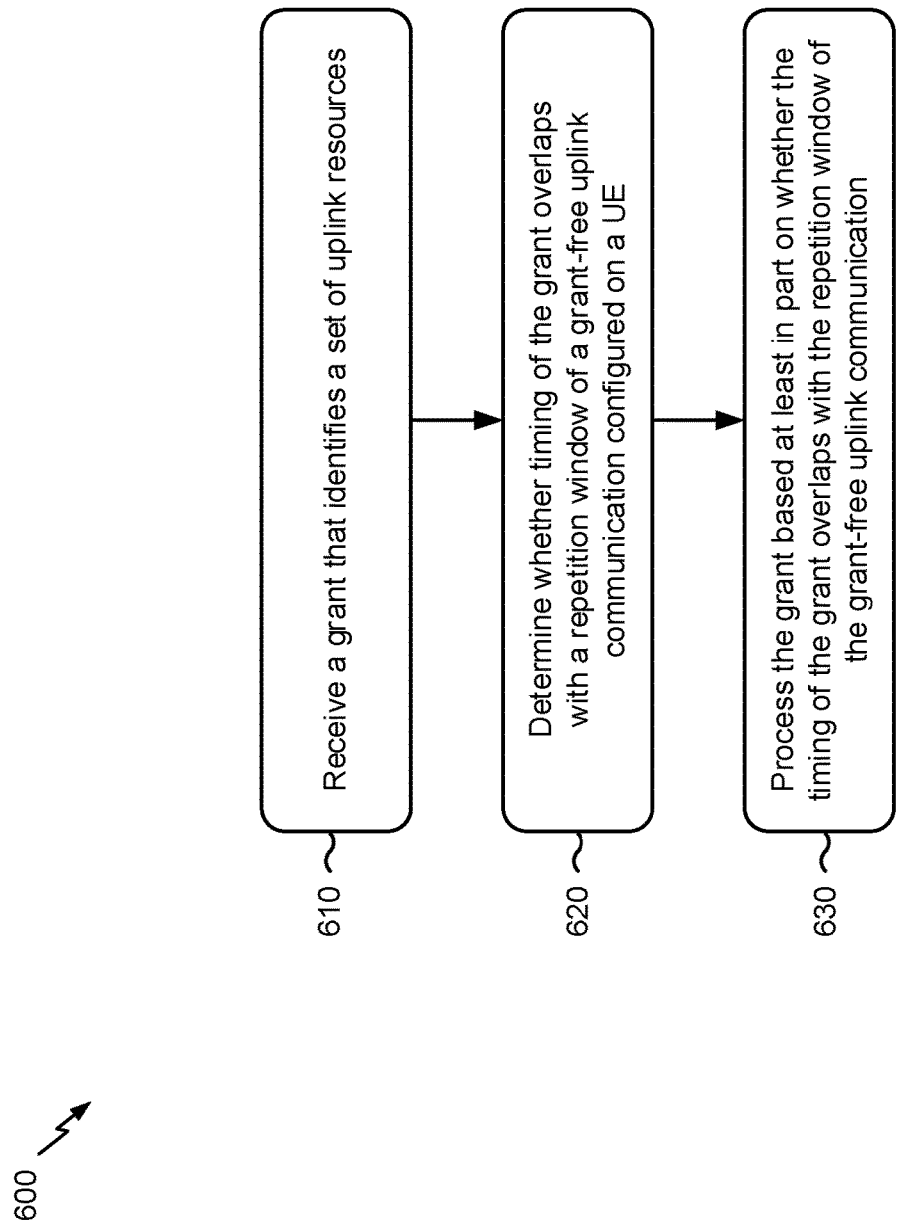
FIG. 6 is a diagram illustrating an example process performed, for example, by a user equipment, in accordance with various aspects of the present disclosure.

FIG. 6 is a diagram illustrating an example process 6 performed, for example, by a UE, in accordance with various aspects of the present disclosure. Example process 600 is an example where a UE (e.g., UE 120) performs grant processing during grant-free uplink transmissions.

As shown in FIG. 6, in some aspects, process 600 may include receiving a grant that identifies a set of uplink resources (block 610). For example, the UE (e.g., using antenna 252, DEMOD 254, MIMO detector 256, receive processor 258, controller/processor 280, and/or the like) may receive a grant that identifies a set of uplink resources, as described above.

As shown in FIG. 6, in some aspects, process 600 may include determining whether a timing of the grant overlaps with a repetition window of a grant-free uplink communication configured on the UE (block 620). For example, the UE (e.g., using receive processor 258, controller/processor 280, and/or the like) may determine whether a timing of the grant overlaps with a repetition window of a grant-free uplink communication configured on the UE, as described above.

As shown in FIG. 6, in some aspects, process 600 may include processing the grant based at least in part on whether the timing of the grant overlaps with the repetition window of the grant-free uplink communication (block 630). For example, the UE (e.g., using receive processor 258, controller/processor 280, and/or the like) may process the grant based at least in part on whether the timing of the grant overlaps with the repetition window of the grant-free uplink communication, as described above.

Process 600 may include additional aspects, such as any single aspect or any combination of aspects described below.

In some aspects, the timing of the grant is associated with a time at which the UE receives the grant. In such a case, whether the timing of the grant overlaps with the repetition window of the grant-free uplink communication is determined based at least in part on whether the UE has completed one or more transmissions of the grant-free uplink communication associated with the repetition window, but not all transmissions of the grant-free uplink communication, at the time at which the UE receives the grant.

In some aspects, the timing of the grant is associated with the set of uplink resources identified by the grant. In such a case, whether the timing of the grant overlaps with the repetition window of the grant-free uplink communication is determined based at least in part on whether the set of uplink resources, identified by the grant, overlaps in time with resources of the repetition window.

In some aspects, when the timing of the grant overlaps with the repetition window of the grant-free uplink communication, the UE processes the grant by interpreting the grant as an acknowledgment (ACK) of data associated with the grant-free uplink communication. In such a case, the UE is configured to transmit other data in the set of uplink resources based at least in part on interpreting the grant as an ACK of the data associated with the grant-free uplink communication.

In some aspects, when the timing of the grant overlaps with the repetition window of the grant-free uplink communication, the UE processes the grant by interpreting the grant as a negative acknowledgment (NACK) of data associated with the grant-free uplink communication. In such a case, the UE is configured to retransmit the data in the set of uplink resources based at least in part on interpreting the grant as a NACK associated with the data of the grant-free uplink communication. Here, the data is retransmitted without any further repetitions.

In some aspects, the UE receives an acknowledgement (ACK) of data associated with the grant-free uplink communication. In such a case, when the timing of the grant overlaps with the repetition window of the grant-free uplink communication, the UE processes the grant by transmitting other data in the set of uplink resources based at least in part on receiving the ACK.

In some aspects, the UE receives a negative acknowledgement (NACK) of data associated with the grant-free uplink communication. In such a case, when the timing of the grant overlaps with the repetition window of the grant-free uplink communication, the UE processes the grant by retransmitting the data associated with the grant-free uplink communication in the set of uplink resources based at least in part on receiving the NACK. Here, the data is retransmitted without any further repetitions.

In some aspects, when the timing of the grant overlaps with the repetition window of the grant-free uplink communication, repetitions of the grant-free uplink communication, associated with the repetition window, are terminated.

In some aspects, when the timing of the grant does not overlap with the repetition window of the grant-free uplink communication, the UE processes the grant by interpreting the grant as a grant associated with transmitting another uplink communication.

In some aspects, when the timing of the grant does not overlap with the repetition window of the grant-free uplink communication, the UE processes the grant by interpreting the grant as a grant for retransmitting data associated with the grant-free uplink communication without any further repetitions.

In some aspects, the UE receives an acknowledgement (ACK) of data associated with the grant-free uplink communication. In such a case, when the timing of the grant does not overlap with the repetition window of the grant-free uplink communication, the UE processes the grant by transmitting other data in the set of uplink resources based at least in part on receiving the ACK.

In some aspects, the UE receives a negative acknowledgement (NACK) of data associated with the grant-free uplink communication. In such a case, when the timing of the grant does not overlap with the repetition window of the grant-free uplink communication, the UE processes the grant by retransmitting the data in the set of uplink resources based at least in part on receiving the NACK. Here, the data is retransmitted without any further repetitions.

In some aspects, the grant-free uplink communication is a physical uplink shared channel (PUSCH) communication.

In some aspects, the grant is received based at least in part on data, associated with the grant-free uplink communication, being decoded by a base station before an end of the repetition window.

In some aspects, the grant is received based at least in part on a determination that a base station is unlikely to successfully decode data associated with the grant-free uplink communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a grant that identifies a set of uplink resources;
   determining whether a timing of the grant overlaps with a repetition window of a grant-free uplink communication configured on the UE based at least in part on whether the set of uplink resources, identified by the grant, overlaps in time with resources of the repetition window; and
   processing the grant based at least in part on whether the timing of the grant overlaps with the repetition window of the grant-free uplink communication.

2. The method of claim 1, wherein the timing of the grant is associated with a time at which the UE receives the grant.

3. The method of claim 2, wherein whether the timing of the grant overlaps with the repetition window of the grant-free uplink communication is determined based at least in part on whether the UE has completed one or more transmissions of the grant-free uplink communication associated with the repetition window, but not all transmissions of the grant-free uplink communication, at the time at which the UE receives the grant.

4. The method of claim 1, wherein the timing of the grant is associated with the set of uplink resources identified by the grant.

5. The method of claim 1, wherein, when the timing of the grant overlaps with the repetition window of the grant-free uplink communication, processing the grant comprises:
   interpreting the grant as an acknowledgment (ACK) of data associated with the grant-free uplink communication.

6. The method of claim 5, wherein the UE is configured to transmit other data in the set of uplink resources based at least in part on interpreting the grant as an ACK of the data associated with the grant-free uplink communication.

7. The method of claim 1, wherein, when the timing of the grant overlaps with the repetition window of the grant-free uplink communication, processing the grant comprises:
   interpreting the grant as a negative acknowledgment (NACK) of data associated with the grant-free uplink communication.

8. The method of claim 7, wherein the UE is configured to retransmit the data associated with the grant-free uplink communication in the set of uplink resources based at least in part on interpreting the grant as a NACK of the data associated with the grant-free uplink communication,
   wherein the data associated with the grant-free uplink communication is retransmitted without any further repetitions.

9. The method of claim 1, further comprising:
   receiving an acknowledgement (ACK) of data associated with the grant-free uplink communication, and
   wherein, when the timing of the grant overlaps with the repetition window of the grant-free uplink communication, processing the grant comprises:
   transmitting other data in the set of uplink resources based at least in part on receiving the ACK.

10. The method of claim 1, further comprising:
    receiving a negative acknowledgement (NACK) of data associated with the grant-free uplink communication, and
    wherein, when the timing of the grant overlaps with the repetition window of the grant-free uplink communication, processing the grant comprises:
    retransmitting the data associated with the grant-free uplink communication in the set of uplink resources based at least in part on receiving the NACK,
    wherein the data associated with the grant-free uplink communication is retransmitted without any further repetitions.

11. The method of claim 1, wherein, when the timing of the grant overlaps with the repetition window of the grant-free uplink communication, repetitions of the grant-free uplink communication, associated with the repetition window, are terminated.

12. The method of claim 1, wherein, when the timing of the grant does not overlap with the repetition window of the grant-free uplink communication, processing the grant comprises:
    interpreting the grant as a grant associated with transmitting another uplink communication.

13. The method of claim 1, wherein, when the timing of the grant does not overlap with the repetition window of the grant-free uplink communication, processing the grant comprises:
    interpreting the grant as a grant for retransmitting data associated with the grant-free uplink communication without any further repetitions.

14. The method of claim 1, further comprising:
    receiving an acknowledgement (ACK) of data associated with the grant-free uplink communication, and
    wherein, when the timing of the grant does not overlap with the repetition window of the grant-free uplink communication, processing the grant comprises:
    transmitting other data in the set of uplink resources based at least in part on receiving the ACK.

15. The method of claim 1, further comprising:
receiving a negative acknowledgement (NACK) of data associated with the grant-free uplink communication, and
wherein, when the timing of the grant does not overlap with the repetition window of the grant-free uplink communication, processing the grant comprises:
retransmitting the data in the set of uplink resources based at least in part on receiving the NACK,
wherein the data is retransmitted without any further repetitions.

16. The method of claim 1, wherein the grant-free uplink communication is a physical uplink shared channel (PUSCH) communication.

17. The method of claim 1, wherein the grant is received based at least in part on data, associated with the grant-free uplink communication, being decoded by a base station before an end of the repetition window.

18. The method of claim 1, wherein the grant is received based at least in part on a determination that a base station is unlikely to successfully decode data associated with the grant-free uplink communication.

19. A user equipment (UE) for wireless communication, comprising:
memory; and
one or more processors coupled to the memory, the memory and the one or more processors configured to:
receive a grant that identifies a set of uplink resources;
determine whether a timing of the grant overlaps with a repetition window of a grant-free uplink communication configured on the UE based at least in part on whether the set of uplink resources, identified by the grant, overlaps in time with resources of the repetition window; and
process the grant based at least in part on whether the timing of the grant overlaps with the repetition window of the grant-free uplink communication.

20. The UE of claim 19, wherein the timing of the grant is associated with a time at which the UE receives the grant or with the set of uplink resources identified by the grant.

21. The UE of claim 20, wherein whether the timing of the grant overlaps with the repetition window of the grant-free uplink communication is determined based at least in part on whether the UE has completed one or more transmissions of the grant-free uplink communication associated with the repetition window, but not all transmissions of the grant-free uplink communication, at the time at which the UE receives the grant.

22. The UE of claim 19, wherein, when the timing of the grant overlaps with the repetition window of the grant-free uplink communication, the memory and the one or more processors, when processing the grant, are configured to one of:
interpret the grant as an acknowledgment (ACK) of data associated with the grant-free uplink communication, or
interpret the grant as a negative acknowledgment (NACK) of data associated with the grant-free uplink communication.

23. The UE of claim 19, wherein the memory and the one or more processors are further configured to:
receive an acknowledgement (ACK) of data associated with the grant-free uplink communication, and
wherein, when the timing of the grant overlaps with the repetition window of the grant-free uplink communication, the memory and the one or more processors, when processing the grant, are configured to:
transmit other data in the set of uplink resources based at least in part on receiving the ACK.

24. The UE of claim 19, wherein the memory and the one or more processors are further configured to:
receive a negative acknowledgement (NACK) of data associated with the grant-free uplink communication, and
wherein, when the timing of the grant overlaps with the repetition window of the grant-free uplink communication, the one or more processors, when processing the grant, are to:
retransmit the data associated with the grant-free uplink communication in the set of uplink resources based at least in part on receiving the NACK,
wherein the data associated with the grant-free uplink communication is retransmitted without any further repetitions.

25. The UE of claim 19, wherein, when the timing of the grant overlaps with the repetition window of the grant-free uplink communication, repetitions of the grant-free uplink communication, associated with the repetition window, are terminated.

26. The UE of claim 19, wherein, when the timing of the grant does not overlap with the repetition window of the grant-free uplink communication, the memory and the one or more processors, when processing the grant, are configured to one of:
interpret the grant as a grant associated with transmitting another uplink communication, or
interpret the grant as a grant for retransmitting data associated with the grant-free uplink communication without any further repetitions.

27. The UE of claim 19, wherein the memory and the one or more processors are further configured to:
receive an acknowledgement (ACK) of data associated with the grant-free uplink communication, and
wherein, when the timing of the grant does not overlap with the repetition window of the grant-free uplink communication, the one or more processors, when processing the grant, are to:
transmit other data in the set of uplink resources based at least in part on receiving the ACK.

28. The UE of claim 19, wherein the memory and the one or more processors are further to:
receive a negative acknowledgement (NACK) of data associated with the grant-free uplink communication, and
wherein, when the timing of the grant does not overlap with the repetition window of the grant-free uplink communication, the one or more processors, when processing the grant, are to:
retransmit the data in the set of uplink resources based at least in part on receiving the NACK,
wherein the data is retransmitted without any further repetitions.

29. A non-transitory computer-readable medium storing one or more instructions for wireless communication, the one or more instructions comprising:
one or more instructions that, when executed by one or more processors of a user equipment (UE), cause the one or more processors to:
receive a grant that identifies a set of uplink resources;
determine whether a timing of the grant overlaps with a repetition window of a grant-free uplink communication configured on the UE based at least in part on whether the set of uplink resources, identified by the grant, overlaps in time with resources of the repetition window; and process the grant based at least in part on whether the timing of the grant overlaps with the repetition window of the grant-free uplink communication.

30. An apparatus for wireless communication, comprising:

means for receiving a grant that identifies a set of uplink resources;

means for determining whether a timing of the grant overlaps with a repetition window of a grant-free uplink communication configured on the apparatus based at least in part on whether the set of uplink resources, identified by the grant, overlaps in time with resources of the repetition window; and means for processing the grant based at least in part on whether the timing of the grant overlaps with the repetition window of the grant-free uplink communication.

* * * * *